(12) United States Patent
Chen et al.

(10) Patent No.: US 7,716,591 B2
(45) Date of Patent: May 11, 2010

(54) SYSTEM AND METHOD FOR DYNAMICALLY GENERATING A WEB PAGE

(75) Inventors: Kaihu Chen, Lake Grove, NY (US); George Hong zhi Hsu, Levittown, NY (US); Surya Rao V. Nanduri, Flushing, NY (US); Manoj Thopcherneni, Rego Park, NY (US); Mohamed Faisal Faquih, Setauket, NY (US); David Dwyer, Rocky Point, NY (US); Myo Min Latt, Forest Hills, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1877 days.

(21) Appl. No.: 10/066,036

(22) Filed: Jan. 31, 2002

(65) Prior Publication Data

US 2003/0020746 A1  Jan. 30, 2003

Related U.S. Application Data

(60) Provisional application No. 60/265,224, filed on Jan. 31, 2001.

(51) Int. Cl.
*G06F 17/30* (2006.01)
*G06F 3/01* (2006.01)

(52) U.S. Cl. ............... 715/743; 715/234; 715/731; 715/745; 715/746; 715/760

(58) Field of Classification Search .......... 715/763, 715/762, 513, 735, 741, 239, 234, 731, 743, 715/745, 746, 760

See application file for complete search history.

(56) References Cited

U.S. PATENT DOCUMENTS 6,012,098 A  1/2000  Bayeh et al.
6,038,597 A *  3/2000  Van Wyngarden .......... 709/219

(Continued)

FOREIGN PATENT DOCUMENTS

WO  WO 00/56033  9/2000
WO  WO 00/73941 A2 * 12/2000

OTHER PUBLICATIONS

Johnson, D: "Converting PC GUIS for non pc devices" Circuit Cellar Inc, vol. 91, pp. 40-42, 44-45, ScP000852859, Feb. 1998.

(Continued)

*Primary Examiner*—Namitha Pillai
(74) *Attorney, Agent, or Firm*—Baker Botts L.L.P.

(57) ABSTRACT

A method for dynamically constructing a web page is disclosed which includes receiving a uniform resource locator identifying a web page. The web page references a plurality of elements. The method also includes receiving a user identifier representing a user and evaluating each of the referenced elements based on the user identifier to identify a subset of at least one element the user is authorized to access. The method further includes determining a data conversion specification associated with the user and determining a data representation specification associated with the user. The subset of elements that the user is authorized to access is converted and presented to the user. Systems and computer-readable storage media for defining and presenting a composite web page are also disclosed.

19 Claims, 9 Drawing Sheets

U.S. PATENT DOCUMENTS

| | | | |
|---|---|---|---|
| 6,535,896 B2 * | 3/2003 | Britton et al. | 715/523 |
| 6,816,849 B1 * | 11/2004 | Halt, Jr. | 707/1 |
| 6,826,597 B1 * | 11/2004 | Lonnroth et al. | 709/207 |
| 2001/0056460 A1 * | 12/2001 | Sahota et al. | 709/201 |

OTHER PUBLICATIONS

Floyd, M.: "Building an XML Workbench" New Architect: Internet Strategies for Technology Leaders; http://www.webtechniques.com/archives/1999/05/beyo/; 5 pages, May 5, 1999.

Notification of Transmittal of the International Search Report or the Declaration for PCT/US02/02972 filed on Jan. 31, 2002; 7 pages, Jul. 4, 2003.

Foreign Search Report from Smoorenburg (2 pages), Jul. 7, 2006.

Summons to attend oral proceedings pursuant to Rule 71(1) EPC; Reference HCD/KT/J45682EP; Application No./Patent No. 02707660.3-1527; 14 pages, Oct. 16, 2007.

* cited by examiner

SYSTEM AND METHOD FOR DYNAMICALLY GENERATING A WEB PAGE

RELATED APPLICATIONS

This application claims priority to U.S. Provisional Application Ser. No. 60/265,224 filed Jan. 31, 2001, entitled "System and Method For Isomorphic Data-Driven Web Page Generation", which is incorporated herein by reference in its entirety. The concurrently filed U.S. Non-Provisional Application entitled "System and Method For Defining and Presenting a Composite Web Page" is also incorporated herein by reference in its entirety.

TECHNICAL FIELD

The present application generally relates to the field of generating and presenting information over a network. More specifically, the present application relates to a system and method for dynamically assembling and presenting web page content.

BACKGROUND

The task of publishing information over a network such as, for example, the Internet, typically involves the conversion of such information into a computer readable format. Scripts consistent with certain standards, such as HTML, JavaScript, and Java, are often employed, as they can be rendered and viewed using a traditional web browser. The creation process of such scripts has evolved substantially since the inception of the Internet. For example, commercial software tools are available for converting information stored in a database to such scripts with relative ease. Such tools are adequate for purposes such as corporate web portals, since the computing environment for this tends to be relatively stable.

New business models, however, such as Application Service Providers ("ASP") have a different set of requirements. An ASP caters to the computing needs of other businesses, and operates the requisite hardware and software on behalf of its customers. An ASP's support of other businesses necessitates the ASP to make a wide range of hardware and software accessible over the Internet, in order to meet the needs of its dynamically changing customer-base. Since each software application that an ASP uses may have its own peculiar web-based interface, there is a need for an ASP to find a solution that can integrate all these disparate web interfaces in a dynamic and cost-effective manner.

Web pages are traditionally generated using one of several methods. Web pages can be manually coded using relevant scripts. However, manually creating web pages is generally suitable in cases where the simplest type of web pages being developed.

A second way to generate a web page is to use available applications specifically developed to create web pages from a certain data source in a systematic way. Such programs include, for example, CGI programs, Java servlets, active server pages and Java server pages. Such commercially available programs include embedded information regarding web page presentation and navigational structures. This is suitable as a mechanism for publishing information from a large data store in a systematic way. However, since much of the page definition is embedded in the program's logic it is difficult to update and maintain web pages created in this manner.

A third way of creating web pages involves using a specialized creation program which is designed for publishing information in a flexible way from a specific type of data source, such as SQL databases. Such programs can provide flexibility regarding how and which information is published, but they are limited as to the type of supported datasources.

A fourth way of creating web pages, involves using a specialized creation program which is designed for aggregating information from various sources and presenting them in a unified context to a user. Such programs are typically used by corporations to publish information to its employees or customers. Such systems, while suitable for use within the relatively stable corporate environment, are insufficient for a dynamic environment like the emerging service provider market. Typically such programs have little or no support for a substantial number of features that service providers utilize, such as fine-grained access control to individual web pages, and branding support of the pages.

Accordingly, known methods for generating web pages have certain disadvantages when used in the creation of web pages in the service provider market.

SUMMARY

The present application provides methods and systems for dynamically generating a web page in a computer processing environment. According to one aspect of the disclosure, a method for dynamically constructing a web page is disclosed. The method includes receiving a uniform resource locator ("URL") identifying a web page. The web page references at least one element. The method also includes receiving a user identifier representing a user and evaluating each of the referenced elements based on the user identifier to identify a subset of at least one element the user is authorized to access. The method further includes determining a data conversion specification associated with the user and determining a data representation specification associated with the user. The method still further includes converting and presenting each of the subset of elements representing the dynamically generated web page.

A system for dynamically constructing a web page is also disclosed. The system includes a processor and a memory storing processor executable instructions for controlling the operation of the processor. The processor executable instructions include instructions to receive a URL identifying a web page. The web page references one or more elements. The system also includes instructions to receive a user identifier representing a user and instructions to evaluate each of the plurality of elements based on the user identifier to identify a subset of at least one element the user is authorized to access. The system further includes instructions to determine a data conversion specification associated with the user, and instructions to determine a data representation specification associated with the user. The system still further includes instructions to convert and present each of the subset of elements.

An apparatus for dynamically constructing a web page is also disclosed. The apparatus includes a means for receiving a URL identifying a web page. The web page references at least one element. The apparatus also includes a means for receiving a user identifier representing a user and a means for evaluating each of the referenced elements based on the user identifier to identify a subset of at least one element the user is authorized to access. The apparatus further includes a means for determining a data conversion specification associated with the user and a means for determining a data representation specification associated with the user. The apparatus still further includes a means for converting and presenting each of the subset of elements representing the dynamically generated web page.

Computer-readable storage media are also disclosed which include processing instructions for implementing certain disclosed methods.

The disclosed systems and methods enable one or more users to simultaneously access a web page associated with a uniform resource locator, with each user receiving only the information which he is authorized to access. The objects, features and advantages of the proposed method and system are readily apparent from the following description of the preferred embodiments when taken in connection with the accompanying drawings.

BRIEF DESCRIPTION OF THE DRAWINGS

For a more complete understanding of the disclosed systems and methods according to the present application, reference is now made to the following description taken in conjunction with the accompanying drawings in which like reference numbers indicate like features and wherein.

DETAILED DESCRIPTION

Figure 1A:
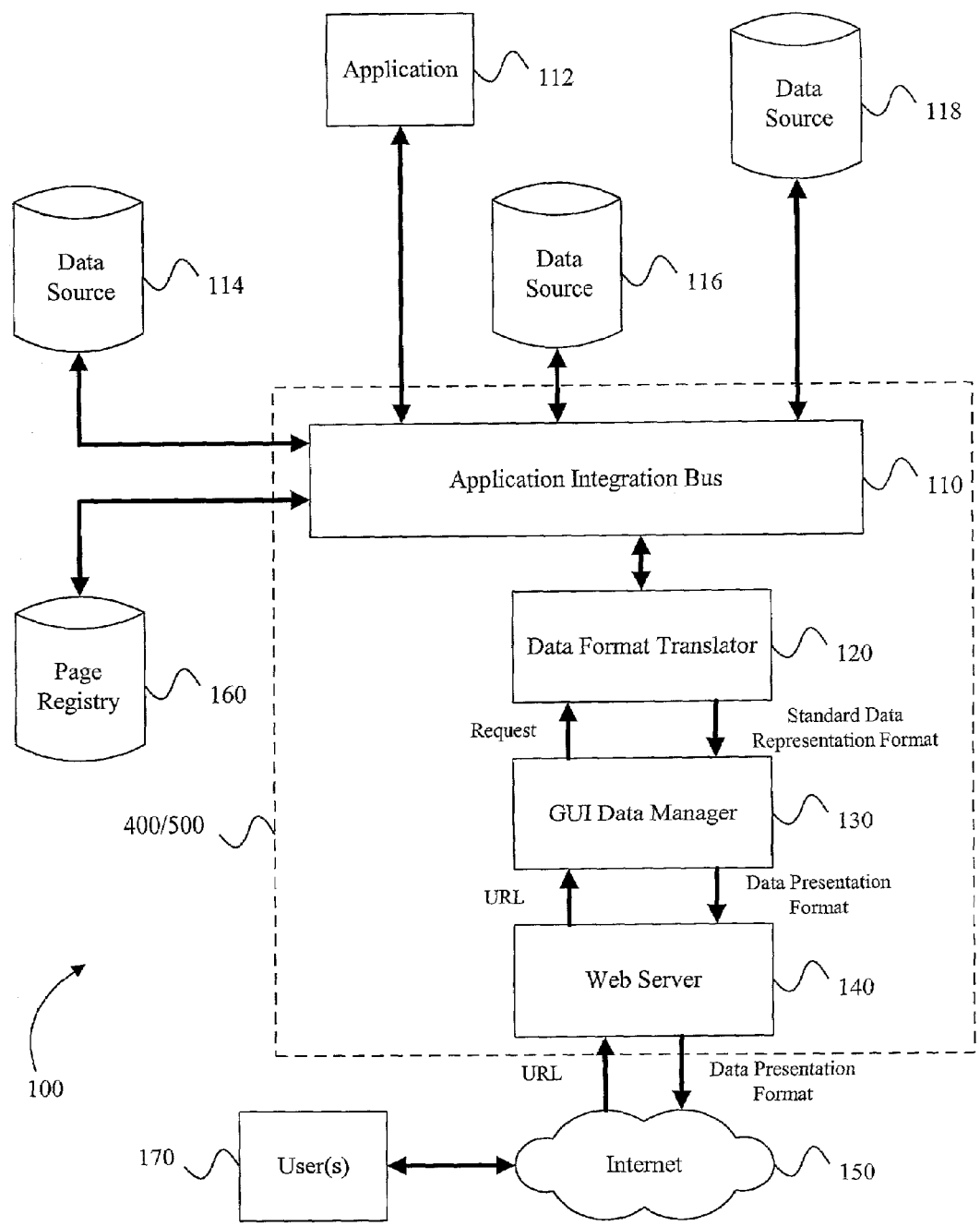
FIG. 1A is a block diagram of an exemplary service provider system according to the present application.
Figure 1B:
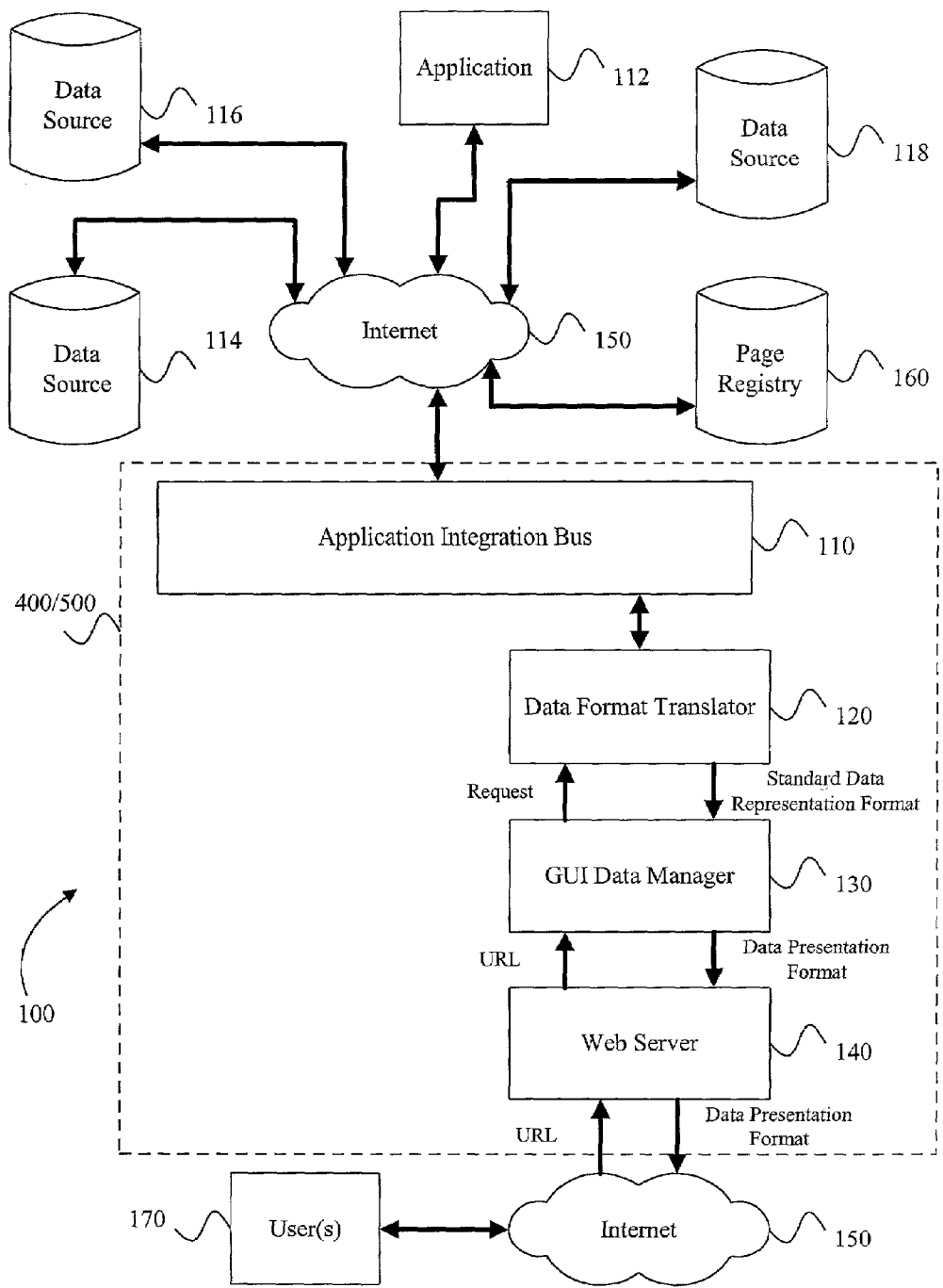
FIG. 1B is a block diagram of an exemplary service provider system according to the present application.

The methods and systems according to the present application generate web pages based on stored page definitions. Such page definitions can be stored locally in, for example, page registry 160, as shown in FIG. 1A, or they be stored in a distributed storage medium, for example, page registry 160, as shown in FIG. 1B. The page definitions may include information regarding relationships between web pages, methods with which data from disparate sources are fetched and converted into uniform language suitable for representing information (e.g., XML representations), style sheet information for mediating foreign data, style sheet information with which visual representation of a web page is constructed, and access control information for each page such that different users can see different portions of the same set of web pages.

In instances where many aspects of a web page and the relationships among different web pages, are given explicit representation in this system, this can be considered a form of isomorphic representation of the actual web pages. A mapping mechanism is provided, such that individual web pages, as well as the navigational structure among pages are dynamically generated from, for example, the page registry 160.

The method and system according to the present application simplify the process of publishing web pages over a network, such as the Internet. Using the method and system described herein, web pages from various sources can be integrated easily and efficiently into a coherent user interface.

Further, the method and system enables access controls to be placed on such web pages, so that users in different roles can have different levels of access. The method and system described herein supports "concurrent branding" of web pages generated, so that each service provider (e.g., ASP or MAP) customers can have its web pages presented with a unique look-and-feel.

Referring to FIG. 1A, there is illustrated a block diagram of an exemplary service provider system 100 capable of dynamically generating web pages. FIG. 1B illustrates an alternative embodiment of a service provider system capable of dynamically generating web pages. As shown, the service provider system includes a system for dynamically constructing a web page 400 connected to a variety of disparate sources, such as application 112, data sources 114, 116 and 118 and page registry 160.

Application Integration Bus

The system for dynamically constructing a web page 400 includes an application integration bus 110 that is capable of storing information to and retrieving information from one or more of the variety of disparate sources, e.g., the application 112, the data sources 114, 116 and 118 and/or the page registry 160. The application integration bus 110 is an infrastructure that facilitates communication between different computer programs in a consistent and reliable manner. An example of a suitable application integration bus is the CA Common Services application, formerly known as Jasmine$_{ii}$, manufactured by Computer Associates International Inc., Islandia, N.Y. FIG. 1A shows the application integration bus 110 connected to the application 112, data sources 114, 116 and 118 and page registry 160 via local connections, such as POTS, wireless telephone networks, Local Area Networks, and Wide Area Networks. FIG. 1B shows the application integration bus 110 connected to the application 112, data sources 114, 116 and 118 and page registry 160 via the Internet.

The application integration bus 110 delivers data from one or more of the disparate sources to data format translator 120.

Data Format Translator

The data format translator 120 is capable of translating data in a format that is not suitable for representing information, e.g., data in a proprietary binary format, into a format that is suitable for representation (e.g., XML syntax (or data) which can represent information such as text documents, spread sheets, database information and web information). More particularly, the data format translator 120 traverses a data structure in, for example a binary form, and transforms the data structure into a format that is suitable for representation, which can be XML syntax (or data). The data format translator 120 uses data received from the application integration bus 110 to process requests and deliver data (e.g., XML data) to a GUI data manager 130.

GUI Data Manager

Generally, the GUI data manager 130 processes requests for data coming into the system 400. The GUI data manager 130 processes data content, presentation specifications, user preferences and user access rights to create a web page to be returned to the requesting web browser. The data content processed by GUI data manager 130 includes content displayed on a web page, which may come from a variety of sources, such as the application integration bus 110 where data retrieved can be for example, converted to XML data using a common XML wrapper; sources reachable from another application, such as the Apache Cocoon framework discussed below; web based GUI's from third party products;

URL's reachable over the Internet; and/or an object in a GUI definition registry (or page registry 160).

The presentation specification employed by GUI Data Manager 130 is typically defined in an XSL file. The user preferences may be stored in a service provider registry (e.g., an ASP registry) and may be used to affect the presentation of the data to the user. The user's access rights may also be stored in the service provider registry. The user access rights define what data or classes of data the user is authorized to access.

More specifically, the GUI data manager 130 converts data from the data format translator 120 into a format suitable for presentation to a user, e.g., HTML or PDF formats. For example, if the output of the data format translator 120 is XML data, the GUI data manager 130 could convert the XML data to HTML data. In addition to interfacing with data format translator 120, the GUI data manager 130 accesses, updates and maintains web pages stored in the page registry 160 via application integration bus 110. GUI data manager 130 also responds to requests received from web server 140.

The web server presents a Uniform Resource Locator ("URL") to the GUI data manager 130, and the GUI data manager responds by sending HTML code to the web server. Generally, web server 140 provides web pages to users 170 over the Internet 150.

The generation of HTML pages by the GUI data manager 130 relies on data stored in, for example, a GUI definition registry or page registry 160. The separation of the data and the presentation specification provides certain advantages. Specifically, the responsibility for generating content may be distributed among a variety of sources. Further, the presentation defined by an XSL file enables the visualization of information to be defined separately. Accordingly, the disclosed GUI framework simplifies the process of publishing and managing large number of application GUIs, while at the same time imposing little restriction on what kind of web page can be produced from this system.

According to one embodiment, the GUI data manager 130 utilizes an architecture that employs a suite of applications with at least one application capable of publishing content over the Internet. An example of such an application is the Apache Cocoon framework developed by the Apache Software Foundation, which produces open source software. More information about the Apache Software Foundation can be found at http://www.apache.org. Other applications similar in functionality are also contemplated. When utilizing the Apache Cocoon application, the Apache Cocoon application translates XML data from the data format translator 120 to HTML. Typically, the GUI data manager 130 merges the XML data with a specified XSL file to produce an HTML file, which can then be transferred over the Internet 150 by web server 140 and displayed to a user 170 via a web browser (not shown) installed on the user's computer.

The Apache Cocoon also allows the use of custom plug-in modules for retrieving specific data from various sources in the XML format. A number of modules may be used to retrieve data from sources, such as the sources connected to the application integration bus 110, or sources directly connected to, for example, an SQL database.

Using the architecture of FIG. 1, the creation of new web pages according to the present application involves the following steps—creating a new object in the GUI definition registry, where the object contains the information used to generate a web page; editing the object's properties to contain correct references to the relevant information needed for web page creation, including data sources and page layout; ensuring that relevant data sources exist to provide the data, and ensuring that a relevant file (e.g., XSL file) is defined for the page. Preferably, the file contains information regarding the presentation of a particular web page. The file may come from a predefined library, and may be reused in many pages to provide look-and-feel consistency, if needed.

GUI Definition/Page Registry

The GUI definition registry or page registry 160 is one aspect of the disclosed system that enables the definition of web pages to become data-driven, and managed centrally. In one embodiment, an application integration framework, which includes a X.500 Directory, may be used for various purposes, such as account management, user profile management, and the storage of application specific settings. The same X.500 Directory may also be used to store the GUI definition registry.

A page is defined as GUI node in the GUI definition registry. A GUI node may be either an instance of the base GUI NODE class, or an instance of one of its subclasses. The base GUI NODE class has the following attributes:

NAME: A unique string property used to identify this node.

LABEL: A string property, which is usually displayed on a web page. For localization, this string needs to be replaced.

TITLE: A string property, which is usually used in the HTML "title" tag of the web page, if it is applicable. For localization, this string needs to be replaced.

KEYWORDS: A string property, which contains a list of keywords. Such keywords may be used optionally as part of a HTML page, which facilitates the use of a web page search engine.

ACCESS RIGHTS: A string property, which defines a group of users who have access to this GUI. The access right of a user is defined in terms of security groups. Each security group is assigned access to certain GUI's in this system. A user belonging to a security group is granted access to the same GUI's as the security group. The range of access permitted by a security group can be re-configured at any time by a system administrator.

CONTENT: A string property that defines one of the following:
  A URL pointing to the source of XML data associated with this node.
  A URL pointing to a source that produces HTML directly. This is useful for integrating third-party webbased GUIs into this system.
  A reference to an object in the ASP registry.
  An XML file on the local machine.
  Information needed to access a data provider over the Jasmine ii data bus. The data is typically retrieved using a method call, or a query. Note that a XML wrapper is used in this process in order to convert Jasmine ii objects/collections into XML format.
  A string expression that reference a specific object in a Jasmine ii provider.

CONTENT TYPE: An integer property, which indicates the type of the content as follows:
  1—The content is XML.
  2—The content is HTML.
  3—The content is a reference to an object in the ASP Registry.
  4—The content is stored in an XML file.
  5—The content comes from a method call to a Jasmine ii provider.
  6—The content comes from query to a Jasmine ii provider.
  7—The content contains a static reference to a certain object in a Jasmine ii provider.

XSL_PRESENTATION: A string property, which is a URL pointing to the XSL file that specifies the visual presentation of this node, if applicable. Note that this property is not used if content source produces HTML.

XSL_TRANSFORMATION: A string property, which is a URL pointing to the XSL file for converting the KML data specified in the CONTENT property (if applicable) to another form. This is useful for bringing disparate XML data sources into this system.

XSL_TRANSFORMATION_WML: A string property, which is used in the same manner as XSL TRANSFORMATION. The XSL file specified here is used for converting the source XML data into WML, which is suitable for display on small form-factor handheld devices, such as, for example, pagers, cellular phones, and palm-top computers.

DISPLAY_IN_TREE: A Boolean property, indicating whether this node should be displayed in a tree GUI. This property allows the run-time option of displaying an abstract GUI structure either as a tree GUI, or as a series of GUIs linked together by mutual references.

ACCESS DEPTH: An integer property, which indicates how deep down the tree that node information must be retrieved. A depth of 0 indicates that only the current node needs to be retrieved. A depth of 1 indicates that both the current node and all of its children nodes must be retrieved. A value of −1 indicates that the entire sub-tree should be fetched, regardless of how deep it is. The default value is 1.

IS-SECURED: A Boolean property, which indicates whether this page is intended for transmission via a secured channel like HTTPS. The default value is false.

ICON_1: A string property, which contains a URL pointing to an icon used for this node.

ICON 2: A string property, which contains a URL pointing to an alternative icon used for this node.

ICON USED: An integer property, which indicates whether ICON _1 or ICON _2 is used for this node. A value of 0 indicates that no icon is to be used. Having alternative icons allow the following to to be supported: Showing a GUI node either as a node in a tree GUI, or as an IMAGE tag on an HTML page. Showing a GUI node on the Common Launch Pad either as a Windows-style movable 32-by-32 icon, or as an image of arbitrary size in typical web style.

TRANSITION EFFECT ENTER: An integer property, indicating the visual transitional effect to be applied when the web page representing the content of this node is entered. This applies only to Internet Explorer V4.0 or higher, and has no effect in a Netscape Navigator browser. The default value is −1, indicating no effect is to be used.

TRANSITION-EFFECT-EXIT: An integer property, similar to the previous one. This is used to indicate the effect to be used on exiting a web page.

IS VISIBLE: A Boolean property, which indicates whether this node is visible or not. The default value is true.

A GUI Root node in the GUI definition registry is used to represent a container for other GUI's. By placing the GUI definition registry in the application registry it is readily accessible via the common data bus.

It should be noted that the CONTENT property of a GUI node in the registry 160 represents a template that is instantiated with information from the requesting URL. For example, a GUI node SHOW-PAYMENTS may be created to represent a page that displays past payment information. In order to use such a GUI node on a specific tenant X for payments over the last year, part of the information contained in the CONTENT property is replaced to reflect the fact that tenant X is of concern here, and that the period is one year. For example, if the CONTENT property contains the string "Args=$USERID$", then it indicates that upon activation, the ID of the presently accessing user must be used to replace "$USERID$".

Methodology Overview

Figure 2:
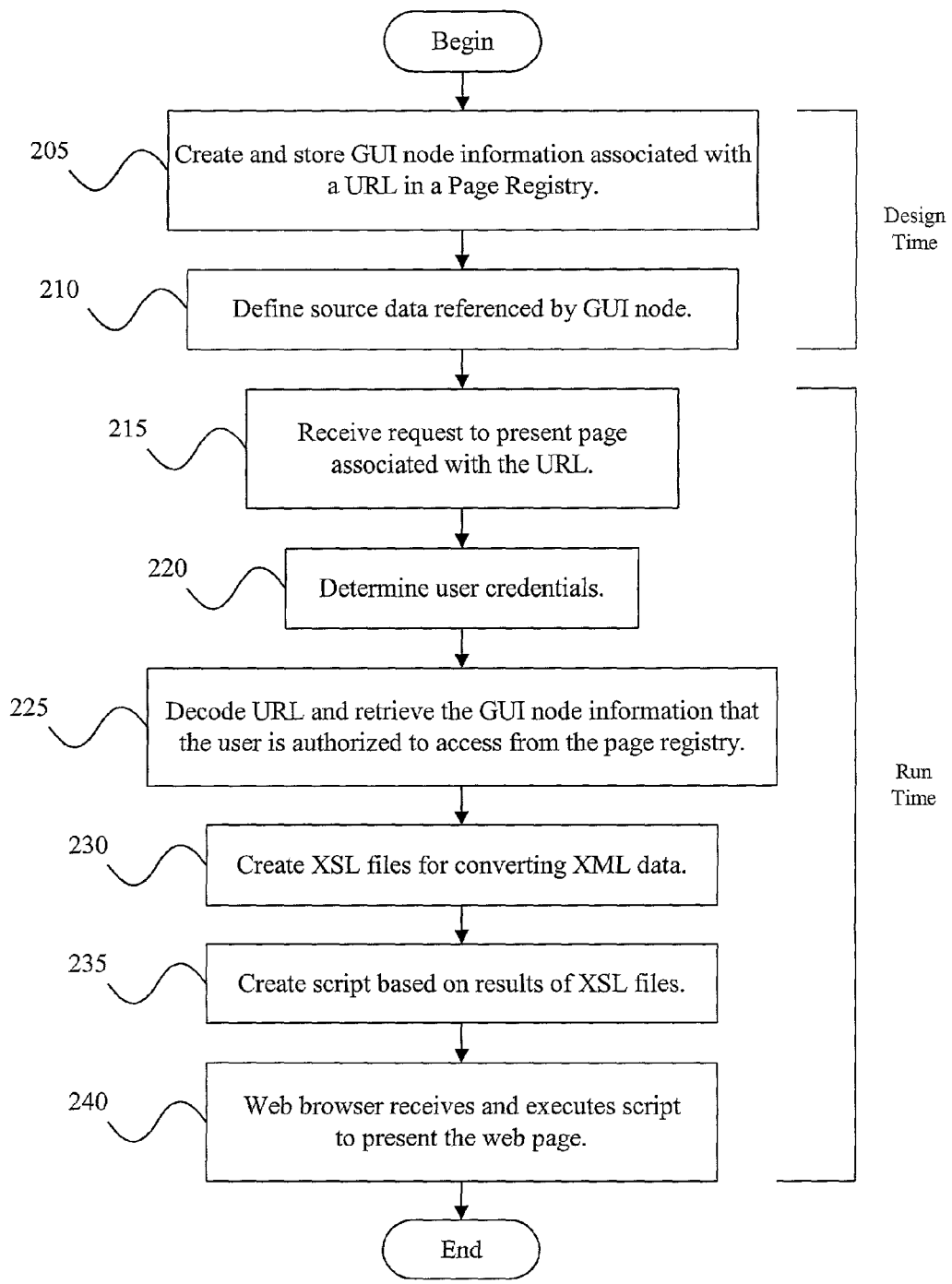
FIG. 2 is an exemplary methodology for dynamically generating a web page in accordance with one embodiment of the present application.

Referring now to FIG. 2, there is illustrated a flowchart describing the operation of one methodology for dynamically generating a web page. This methodology will be described with the translation of data structures to XML syntax and the XML syntax to HTML to dynamically present web pages to a user. Using the processing environment illustrated in FIG. 1A, a data representation scheme is used to represent each individual web page to be published by the system. Such representation of a web page, called a GUI node, is an embodiment of the aspects of a web page, including for example, where and how the requisite data is accessed, how abstract data is turned into a visible presentation, how such a web page is related to other pages, and who is allowed to access this page.

As shown at block 205, this GUI node information is created by a web page designer and stored in page registry 160 at design time. In one embodiment, page registry 160 is implemented on top of either a LDAP directory or Database due to their capability to store large amounts of information and allow for quick access.

At block 210, the source of the data needed in a web page is defined as part of the relevant GUI node. This includes information such as the name of the data source, and name of the method, and the requisite arguments. During the generation phase of a web page, such data can be fetched through the use of the application integration bus 110.

At run-time, a request to this system is received in the form of a URL, typically initiated from a web browser by a user, as shown at block 215. The overall task of the system is to generate the next web page in the prescribed form and content. This is accomplished using the GUI data manager 130.

GUI data manager 130 determines the credentials of the user (block 220). GUI data manager 130 further decodes a URL in order to retrieve the GUI node information from the page registry 160 for the requested web page that the user is authorized to access (block 225).

At step 230, the data format translator retrieves an XSL file relevant to a given GUI node. The GUI data manager uses the results of the XSL file to create a script, such as an HTML file (block 235). The web server 140 delivers the script for execution by a web browser to present the dynamically generated web page.

Figure 3A:
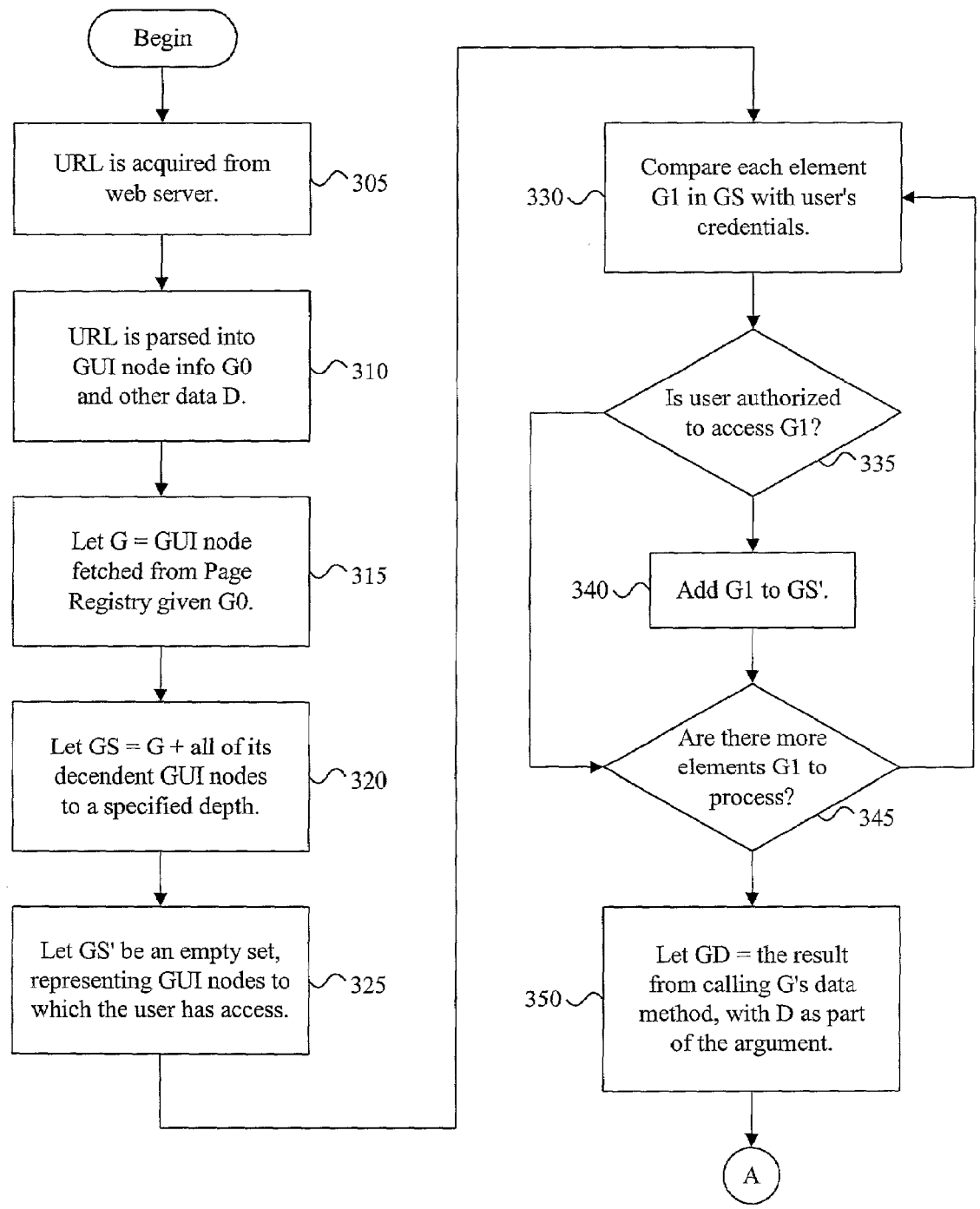
FIGS. 3A-3C is a more detailed exemplary methodology for dynamically generating a web page in accordance with one embodiment of the present application.
Figure 3B:
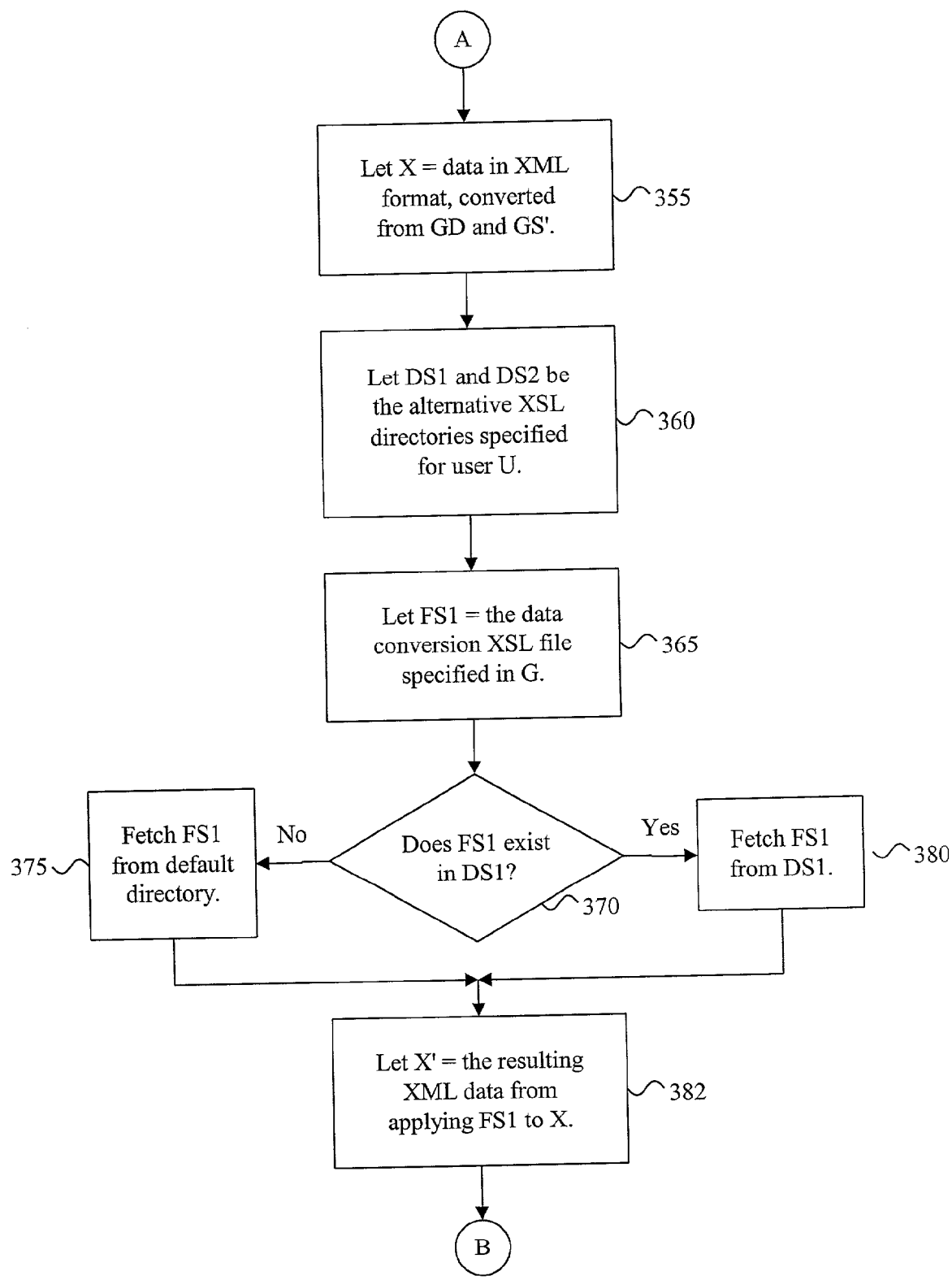
Figure 3C:
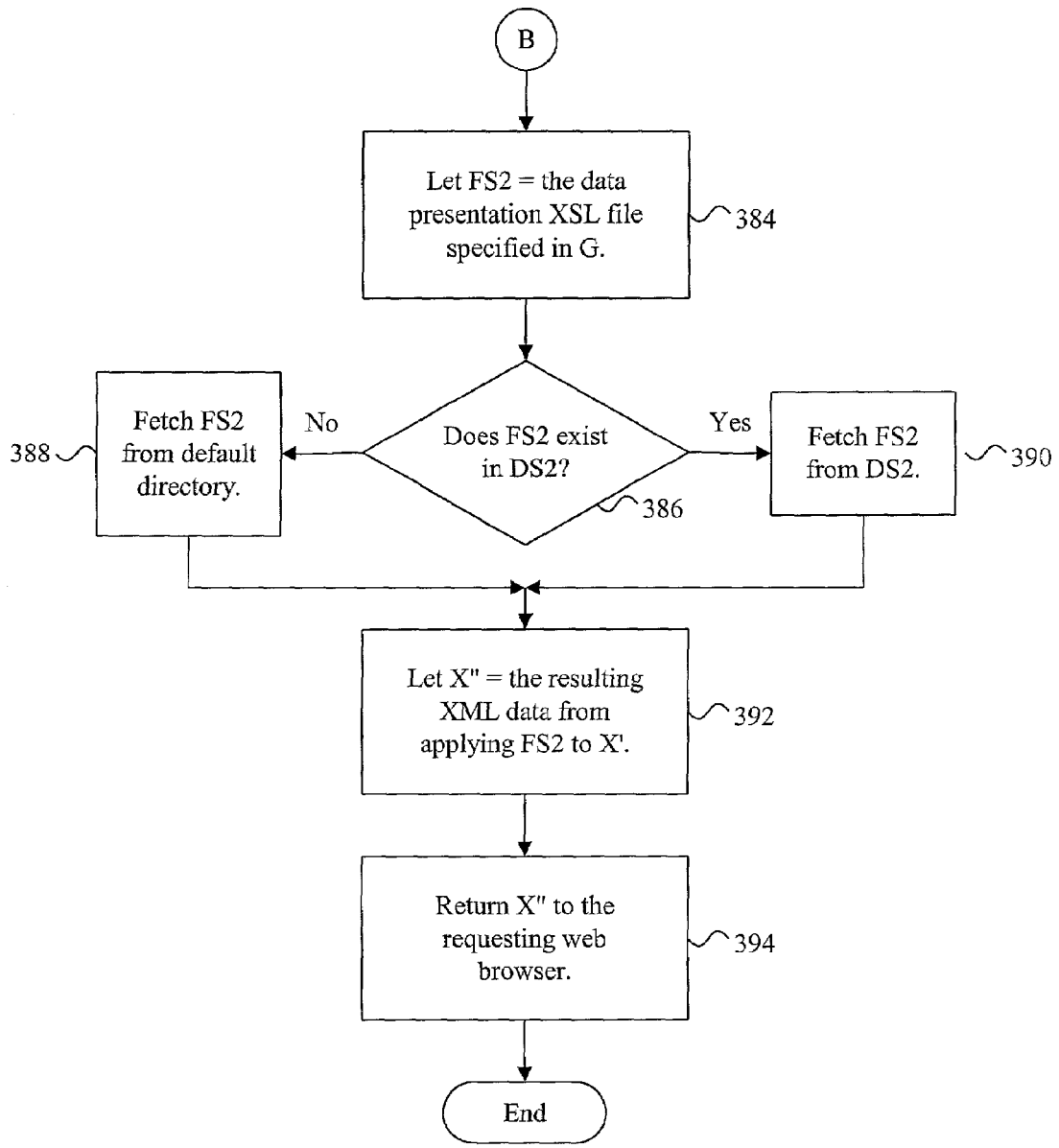

Referring to FIGS. 3A-3C, there is illustrated a more detailed exemplary methodology for dynamically generating a web page at run time in accordance with one embodiment of the disclosed method. At run time, a web page designer has created and stored the data schema and instances defined in the GUI definition registry 160. FIGS. 3A-3C describe how various components of the system work together to create web pages out of such information.

At block 305, a request for displaying one or more web pages are received as a URL through web server 140, and processed by GUI data manager 130. At block 310, GUI data manager 130 parses the URL into GUI node information, which includes a reference to a node in the GUI page registry 160, and optionally a reference to a data source.

The GUI data manager 160 retrieves the following information: the relevant GUI node; the source of data which is may be in XML format, indicated by the node's CONTENT property; the XSL file as indicated by the node's XSL property, where applicable; the user's access control data from, for example the service provider registry; and the user's preference profile from the service provider registry. It should be noted that some settings in the profile may be used to override information in the GUI definition registry, and that it is also possible that part of the URL specifies the complete information needed for retrieval, without using information from the GUI node.

The GUI data manager 130 fetches a GUI node G (block 315) that the URL references, and all descendent GUI nodes, to a specified depth, that are to be embedded in G (block 320). When G is realized into a web page, such embedded GUI nodes are turned into hyperlinks in the page.

At blocks 325 through 345, access control information of every GUI node associated with the requested URL is compared to the credentials of the user who initiated the request. The GUI nodes that the user is allowed access are returned and collected in set GS'.

At block 325, information regarding the data source of the GUI nodes that the user is authorized to access are retrieved. The received data are then converted into XML format. Two alternative directories DS1 and DS2 may be specified for the particular user U (block 360). Of course, for users without specific data requirements, default directories may be used.

Two Extensible Stylesheet Language ("XSL") files FS1 and FS2, which are specified in G, are identified at blocks 370 and 384, respectively. FS1 is retrieved at blocks 370 through 380 and FS2 is retrieved at blocks 386 through 390. XSL is a standard Internet scripting language for converting one form of XML into another. At block 382, the XSL file FS1 is applied to the XML data to effect a conversion of the XML data into another form. This may be necessary in some cases, since such XML data may come from a foreign source that uses a different set of XML tags, and this process converts them into a format that is acceptable to this system.

At block 392, the XSL file FS2 is applied to the result from the block 382, and creates a script which typically contains HTML, JavaScript, and Java code. The script is then returned to the originating web browser where the result is displayed as a web page. At block 394, the script describing the requested web page is returned to the web browser of user U for presentation.

In order to allow different users to use the same GUI node but different XSL files, a set of environment variables are retrieved for the user who is accessing this system. Such variables are stored in Page Registry 160, and each user may have his own set of variables. Such variables specify the alternative directories where a user's XSL files reside. If the requisite XSL files do not exist in the alternative directory, the default XSL files are used.

It should be noted that the use of the environmental variables described above enables both branding and the integration of foreign data sources. Environmental variables are advantageous because they enable all users to share the same set of GUI nodes, but provide each user his/her our own private version of the FS2 file, making it possible for each user to have a separate look-and-feel by providing an alternative FS2 file.

Similarly, allowing a user to specify his own XSL file FS1 permits the XML data to be transformed in a way specific to the data source. This makes it possible to apply the necessary transformation to foreign data sources, in order to turn them into a form that is acceptable to this system.

Figure 4:
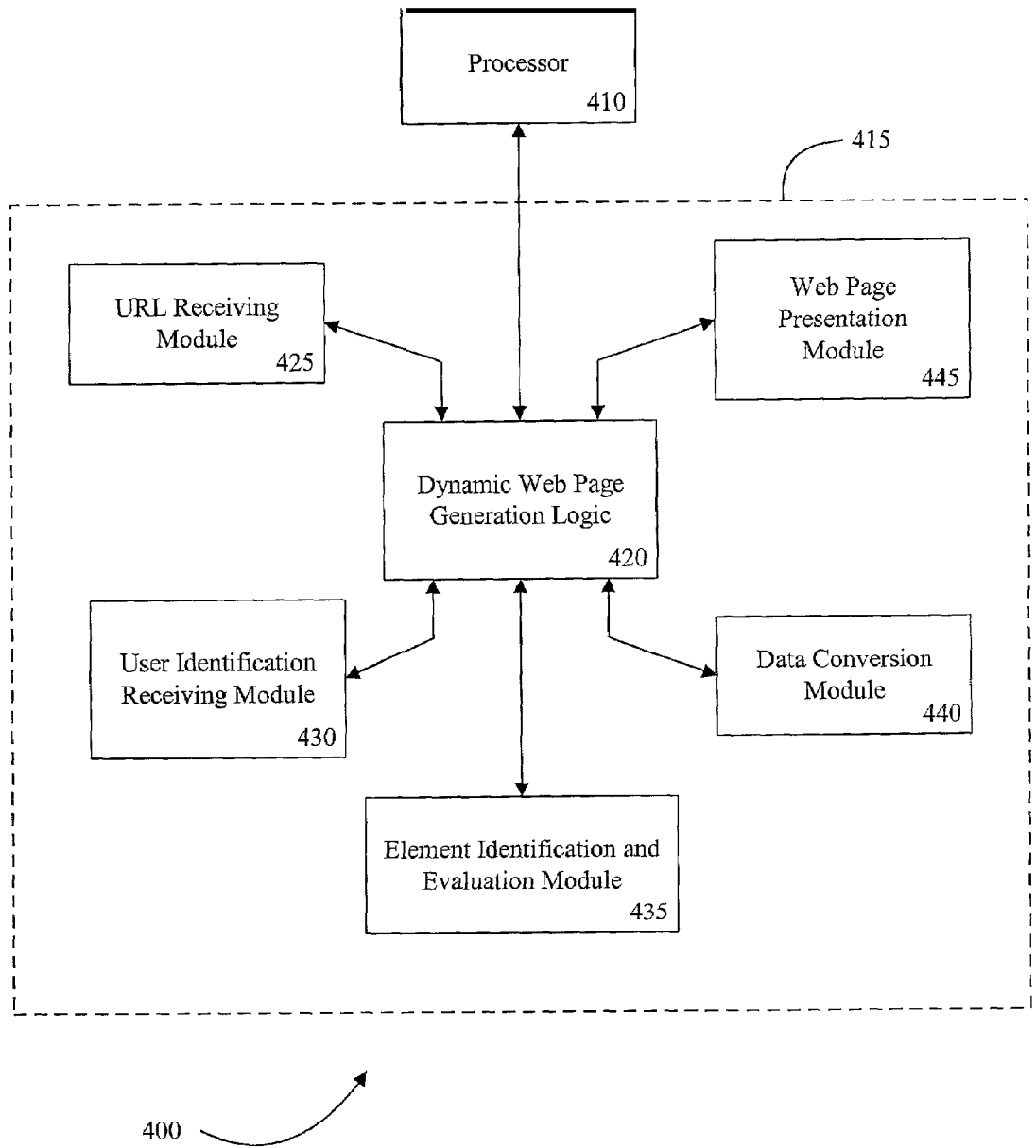
FIG. 4 is a block diagram illustrating a system for dynamically generating a web page in accordance with one embodiment of the present application.

In FIG. 4 there is illustrated one embodiment of a system for dynamically generating a web page 400. As shown, the system includes a processor 410 and a memory 415. The memory 415 is connected to the processor 410 and stores processor executable instructions for dynamically generating a web page.

The memory 415 includes dynamic web page generation logic 420 for dynamically generating and presenting a requested web page. The dynamic web page generation logic 420 employs a URL receiving module 425 to receive a URL representing a requested web page. The generation logic 420 also employs a user identification receiving module 430 and an element identification and evaluation module 435 to respectively identify a user and identify elements referenced by the requested web page that the user is authorized to access.

A data conversion module 440 is used by the dynamic web page generation logic 420 to convert data referenced by the requested web page from various protocols to a standard protocol. The generation logic 420 provides the data in a standard format to a web page presentation module 445. In one embodiment, web page presentation module 445 is a standard Internet web browser.

In alternative embodiments, the system illustrated in FIGS. 4 may be embodied as computer readable code stored on a computer readable medium. The code may include one or more computer/processor executable instructions that cause the computer to act in a selected manner. The computer readable medium may be an optical storage device such as a CD-ROM or DVD-ROM, a magnetic storage device such as a hard disk or floppy disk, an electronic storage device such as a memory card, RAM, ROM, EPROM, EEPROM, or flash memory, or any other storage device capable of storing computer readable processor instructions.

Although the disclosed systems and methods have been described in terms of specific embodiments and applications, persons skilled in the art can, in light of this teaching, generate additional embodiments, including various changes, substitutions and alterations, without exceeding the scope or departing from the spirit of the disclosure. Accordingly, it is to be understood that the drawing and description in this disclosure are proffered to facilitate comprehension of the systems and methods, and should not be construed to limit the scope thereof.

Figure 5A:
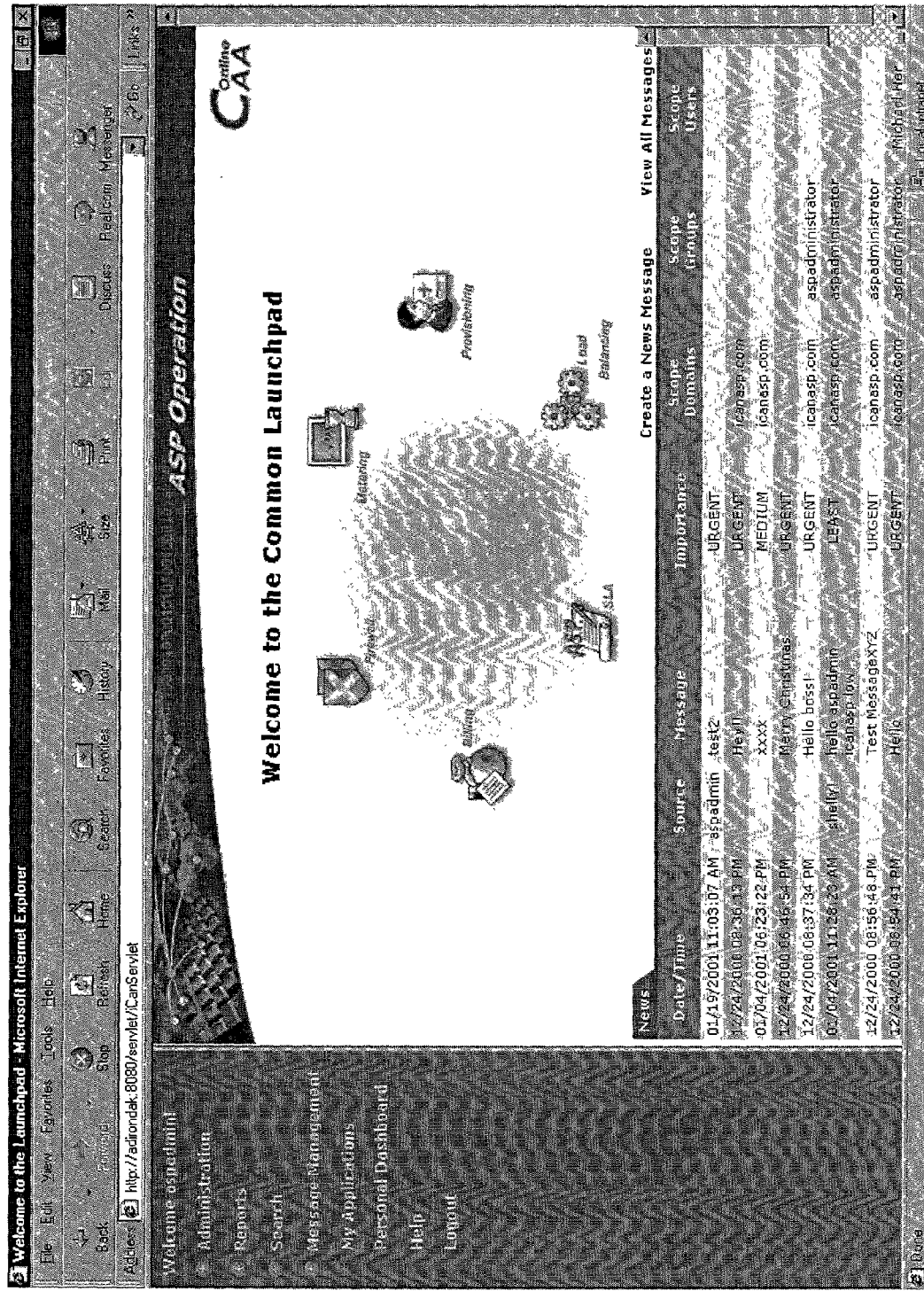
FIG. 5A is a computer screen display illustrating a first branded web page presentation according to one implementation of the disclosed system and method.
Figure 5B:
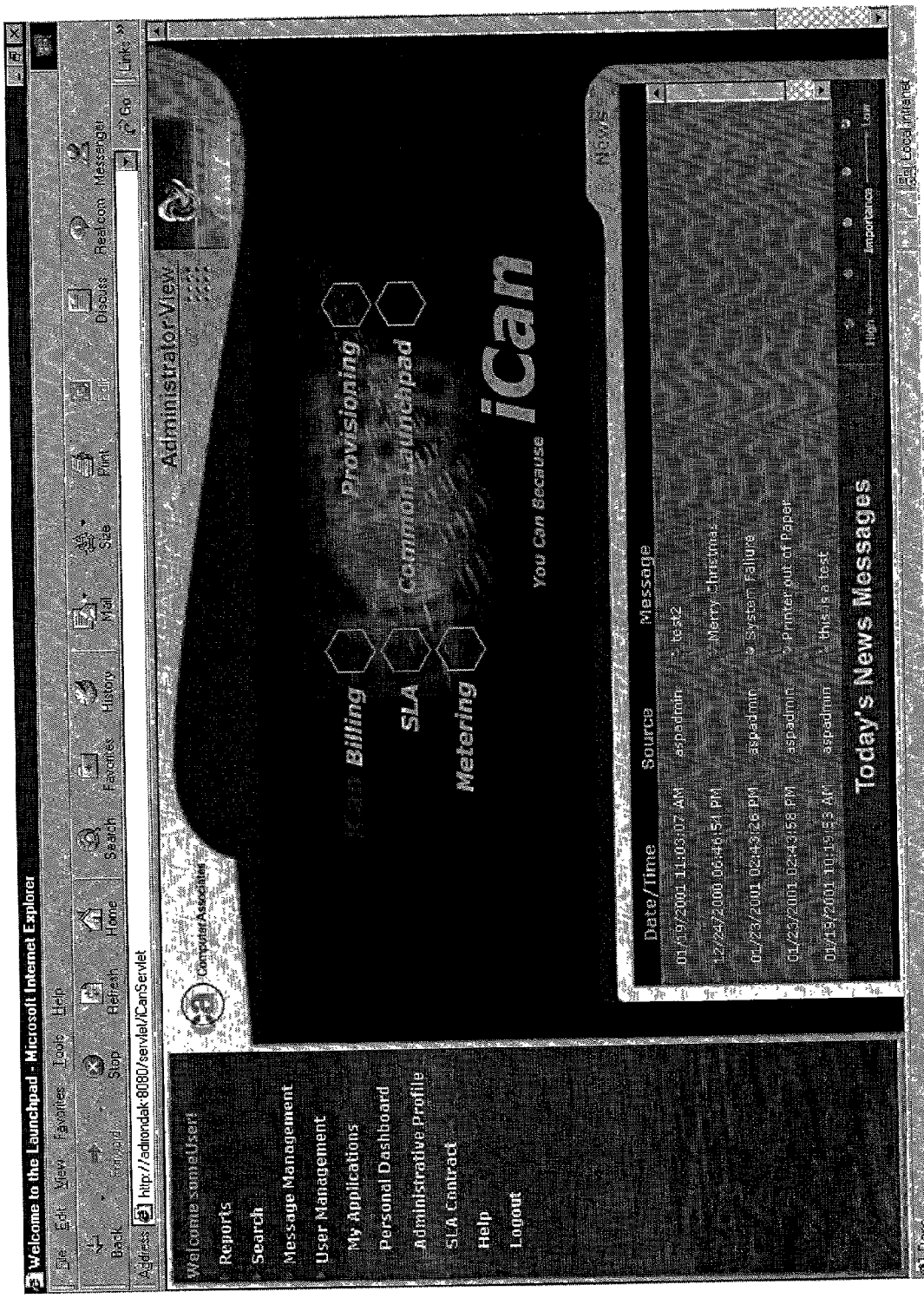
FIG. 5B is a computer screen display illustrating a second branded web page presentation according to one implementation of the disclosed system and method.

Referring now to FIG. 5A, there is a computer screen display illustrating a web page presentation that has been branded for a first user. FIG. 5B is a corresponding web page presentation that has been branded for a second user. Both users requested the same URL of Web Server 140, but each received a different display according to each user's identity.

What is claimed is:

1. A method for dynamically constructing a web page, comprising:

receiving a request for a webpage identified by a URL and defined by a plurality of GUI nodes stored in a page registry, wherein at least two of the plurality of GUI nodes each comprise an access right property defining a group of users who have access to the GUI node;

determining a security credential of a user associated with the request;

comparing, for each of the at least two of the plurality of GUI nodes, the access right property representing the group of users who have access to the GUI node to the determined security credential of the user associated with the request;

identifying, based at least in part on the comparing, a subset of the plurality of GUI nodes that the user is authorized to access;

retrieving the subset of the plurality of GUI nodes the user is authorized to access;

determining a data representation specification associated with the user, the data representation specification specifying one or more data formats appropriate for the user;

converting the subset of the plurality of GUI nodes the user is authorized to access into a script conforming to the data representation specification associated with the user;

transmitting the script to the user; and further comprising identifying, based on the comparing, a second subset of the plurality of GUI nodes that the user is not authorized to access, wherein each GUI node of the second subset of the plurality of GUI nodes is capable of being converted into a second script conforming to the data representation specification associated with the user.

2. The method of claim 1, further comprising receiving a user identifier associated with the security credential of the user, wherein the security credential of the user is determined by retrieving the security credential using the received user identifier.

3. The method of claim 1, wherein the at least two of the plurality of GUI nodes comprises substantially all of the plurality of GUI nodes stored in the page registry.

4. The method of claim 1, wherein the subset of GUI nodes comprise disparate XML formats; and further comprising converting the subset of GUI nodes into a common XML format using an XSL data conversion specification file.

5. The method of claim 1, wherein the data representation specification comprises an XSL file.

6. The method of claim 1, wherein the script comprises HTML, JavaScript, or Java code.

7. The method of claim 1, wherein converting the subset of the plurality of GUI nodes comprises retrieving environmental variables for the user, the environmental variables comprising one or more private XSL files for the user.

8. The method of claim 1, wherein converting the subset of the plurality of GUI nodes comprises retrieving default XSL files, the default XSL files comprising one or more XSL files shared by the user and one or more other users.

9. Logic embodied in a computer-readable medium operable, when executed by a computer processor, to perform the steps comprising:

receiving a request for a webpage identified by a URL and defined by a plurality of GUI nodes stored in a page registry, wherein at least two of the plurality of GUI nodes each comprise an access right property defining a group of users who have access to the GUI node;

determining a security credential of a user associated with the request;

comparing, for each of the at least two of the plurality of GUI nodes, the access right property representing the group of users who have access to the GUI node to the determined security credential of the user associated with the request;

identifying, based at least in part on the comparing, —a subset of the plurality of GUI nodes that the user is authorized to access;

retrieving the subset of the plurality of GUI nodes the user is authorized to access;

determining a data representation specification associated with the user, the data representation specification specifying one or more data formats appropriate for the user;

converting the subset of the plurality of GUI nodes the user is authorized to access into a script conforming to the data representation specification associated with the user;

transmitting the script to the user; and identifying, based on the comparing, a second subset of the plurality of GUI nodes that the user is not authorized to access, wherein each GUI node of the second subset of the plurality of GUI nodes is capable of being converted into a second script conforming to the data representation specification associated with the user.

10. The logic of claim 9, wherein the steps further comprise receiving a user identifier associated with the security credential of the user, wherein the security credential of the user is determined by retrieving the security credential using the received user identifier.

11. The logic of claim 9, wherein the at least two of the plurality of GUI nodes comprises substantially all of the plurality of GUI nodes stored in the page registry.

12. The logic of claim 9, wherein the subset of GUI nodes comprise disparate XML formats; and wherein the steps further comprise converting the subset of GUI nodes into a common XML format using an XSL data conversion specification file.

13. The logic of claim 9, wherein the data representation specification comprises an XSL file.

14. The logic of claim 9, wherein the script comprises HTML, JavaScript, or Java code.

15. A system for dynamically constructing a webpage, comprising:

a computer-readable memory storing a GUI data manager operable, when executed, to:

receive a request for a webpage identified by a URL and defined by a plurality of GUI nodes stored in a page registry, wherein at least two of the plurality of GUI nodes each comprise an access right property defining a group of users who have access to the GUI node;

determine a security credential of a user associated with the request;

compare, for each of the at least two of the plurality of GUI nodes, the access right property representing the group of users who have access to the GUI node to the determined security credential of the user associated with the request;

identify, based at least in part on the comparisons, a subset of the plurality of GUI nodes that the user is authorized to access;

retrieve the subset of the plurality of GUI nodes the user is authorized to access;

determine a data representation specification associated with the user, the data representation specification specifying one or more data formats appropriate for the user;

convert the subset of the plurality of GUI nodes the user is authorized to access into a script conforming to the data representation specification associated with the user; and identify, based on the comparisons, a second subset of the plurality of GUI nodes that the user is not authorized to access, wherein each GUI node of the second subset of the plurality of GUI nodes is capable of being converted into a second script conforming to the data representation specification associated with the user.

16. The system of claim 15, wherein the GUI data manager is further operable, when executed, to receive a user identifier associated with the security credential of the user, wherein the security credential of the user is determined by retrieving the security credential using the received user identifier.

17. The system of claim 15, wherein the at least two of the plurality of GUI nodes comprises substantially all of the plurality of GUI nodes stored in the page registry.

18. The system of claim 15, further comprising a web server comprising logic operable, when executed, to:
receive the request for the webpage;
transmit the request for the webpage to the GUI manager;
receive the script conforming to the data representation specification associated with the user from the GUI manager; and
transmit the script conforming to the data representation specification association to the user.

19. The system of claim 15, wherein the subset of the plurality of GUI nodes comprise disparate XML formats; and
wherein the GUI data manager is further operable, when executed, to convert the subset of the plurality of GUI nodes into a common XML format.

* * * * *